(12) United States Patent
Freitag et al.

(10) Patent No.: US 9,643,322 B2
(45) Date of Patent: May 9, 2017

(54) CONTROL METHOD FOR A BALANCING LIFTING GEAR AND BALANCING LIFTING GEAR

(71) Applicant: Demag Cranes & Components GmbH, Wetter (DE)

(72) Inventors: Holger Freitag, Bochum (DE); Giorgio Maccioni, Witten (DE); Giuliano Persico, Wetter (DE)

(73) Assignee: Terex MHPS GmbH, Düsseldorf (DE)

( * ) Notice: Subject to any disclaimer, the term of this patent is extended or adjusted under 35 U.S.C. 154(b) by 210 days.

(21) Appl. No.: 13/860,752

(22) Filed: Apr. 11, 2013

(65) Prior Publication Data

US 2013/0282178 A1 Oct. 24, 2013

(30) Foreign Application Priority Data

Apr. 20, 2012 (DE) .................. 10 2012 103 515

(51) Int. Cl.
*B25J 13/08* (2006.01)
*B25J 13/02* (2006.01)
(Continued)

(52) U.S. Cl.
CPC .............. *B25J 13/085* (2013.01); *B25J 13/02* (2013.01); *B66D 3/18* (2013.01); *B66D 1/40* (2013.01);
(Continued)

(58) Field of Classification Search
CPC ........... B25J 13/02; B25J 13/085; B66D 3/18; B66D 1/40; B66D 1/46; B66D 1/48; B66D 1/56
(Continued)

(56) References Cited

U.S. PATENT DOCUMENTS 6,073,496 A * 6/2000 Kuhn .................. B66C 1/40
73/862.56
6,204,619 B1 * 3/2001 Gu .................. B66C 23/005
254/1
(Continued)

FOREIGN PATENT DOCUMENTS

DE 20100584 U1 5/2002
EP 2177308 A1 4/2010
(Continued)

*Primary Examiner* — Khoi Tran
*Assistant Examiner* — Robert Nguyen
(74) *Attorney, Agent, or Firm* — Gardner, Linn, Burkhart and Flory, LLP (57) ABSTRACT

A control method for a balancing lifting gear which includes a lifting motor that can be actuated by a controller and uses a control handle with a force sensor to lift and lower a load-supporting device. In a "Balance" operating mode, the load-supporting device, with or without a picked-up load, is raised or lowered by the controller in response to a force applied by an operator. In order to ensure disturbance-free handling of a load when removing or attaching a load, a "Pick-up" operating mode or an "Assemble" operating mode is selected, in which the load-supporting device is moved independently without the influence of the force of the operator by the controller in the lifting or lowering direction in dependence upon the signals determined by the force sensor. A balancing lifting gear which operates in accordance with the aforementioned control method is also disclosed.

19 Claims, 4 Drawing Sheets

(51) Int. Cl.
  *B66D 3/18* (2006.01)
  *B66D 1/56* (2006.01)
  *B66D 1/40* (2006.01)
  *B66D 1/46* (2006.01)
  *B66D 1/48* (2006.01)

(52) U.S. Cl.
  CPC ................. *B66D 1/46* (2013.01); *B66D 1/48* (2013.01); *B66D 1/56* (2013.01)

(58) Field of Classification Search
  USPC .......................... 700/257; 254/266, 273, 275
  See application file for complete search history.

(56) References Cited

U.S. PATENT DOCUMENTS

| | | | | |
|---|---|---|---|---|
| 6,204,620 | B1* | 3/2001 | McGee et al. | 318/568.11 |
| 6,386,513 | B1* | 5/2002 | Kazerooni | B66C 1/0212 212/285 |
| 6,430,473 | B1* | 8/2002 | Lee | B25J 9/162 318/568.16 |
| 6,738,691 | B1* | 5/2004 | Colgate | B25J 9/1689 318/568.11 |
| 6,928,336 | B2* | 8/2005 | Peshkin | G05B 19/41815 212/330 |
| 7,120,508 | B2 | 10/2006 | Peshkin et al. | |
| 7,185,774 | B2* | 3/2007 | Colgate | B66D 3/18 212/270 |
| 8,068,941 | B2* | 11/2011 | Hennig | A61B 5/6843 303/155 |
| 8,226,072 | B2* | 7/2012 | Murayama | B25J 9/1674 269/55 |
| 8,419,338 | B2* | 4/2013 | Konosu | B25J 5/02 212/292 |
| 2002/0111712 | A1* | 8/2002 | Peshkin | B66D 3/20 700/230 |
| 2004/0143364 | A1* | 7/2004 | Colgate | B66D 3/18 700/213 |
| 2005/0267638 | A1 | 12/2005 | Peshkin et al. | |
| 2007/0112458 | A1* | 5/2007 | Kondo | B25J 9/026 700/213 |
| 2008/0188985 | A1* | 8/2008 | Sakano | 700/260 |
| 2009/0149855 | A1* | 6/2009 | Iwaki | A61H 1/0237 606/57 |
| 2009/0212478 | A1* | 8/2009 | Murayama | B25J 9/0018 269/56 |
| 2009/0216378 | A1* | 8/2009 | Murayama | B25J 9/107 700/275 |
| 2010/0185321 | A1* | 7/2010 | Odashima | B23P 19/10 700/230 |
| 2010/0262291 | A1* | 10/2010 | Takesue | G05B 19/423 700/260 |
| 2011/0010012 | A1* | 1/2011 | Murayama | B25J 19/06 700/260 |
| 2011/0029133 | A1* | 2/2011 | Okazaki | A61G 7/1017 700/258 |
| 2011/0040411 | A1* | 2/2011 | Murayama | B25J 5/02 700/260 |
| 2012/0023660 | A1* | 2/2012 | Ota | A61G 7/1019 5/81.1 R |
| 2012/0168397 | A1* | 7/2012 | Lim | B66D 3/18 212/273 |
| 2013/0151009 | A1* | 6/2013 | Okazaki | B25J 13/085 700/260 |
| 2013/0251496 | A1* | 9/2013 | Takesue | B66D 3/18 414/800 |
| 2014/0107843 | A1* | 4/2014 | Okazaki | B25J 13/085 700/260 |

FOREIGN PATENT DOCUMENTS

| | | |
|---|---|---|
| WO | 9843911 A1 | 10/1998 |
| WO | 0069771 A1 | 11/2000 |

\* cited by examiner

CONTROL METHOD FOR A BALANCING LIFTING GEAR AND BALANCING LIFTING GEAR

BACKGROUND OF THE INVENTION

The invention relates to a control method for a balancing lifting gear and, in particular, for use with a lifting gear having a lifting motor which can be actuated by a controller and uses a control handle with a force sensor to lift and lower a load-supporting device. The invention also relates to a balancing lifting gear having a lifting motor which can be actuated by a controller and uses a control handle with a force sensor to lift and lower a load picking-up means, also referred to herein as a load-supporting device.

The German utility model DE 201 00 584 U1 discloses a so-called balancing lifting gear or a so-called cable balancer. A cable balancer includes a cable winch, a control handle and a load-supporting device and enables an operator to lift or lower a load, which is fastened to the load-supporting device, in a type of floating state in an almost weightless manner. A controller which is allocated to the cable winch balances the weight force of the load so that a manual force is applied by an operator to the load, the load-supporting device, or the control handle effects lifting or lowering of the load, depending upon the direction in which the manual force is effective. The controller can select the lifting or lowering speed in proportion to the applied force. In order to determine the manual force, a force sensor is disposed in the control handle at the transition from the upper end of the control handle to the cable. The weight of the load can also be measured by this force sensor and, by means of a change in weight force, it is possible to determine the manual force which serves a control variable for the controller and the lifting and lowering speed determined therefrom. The response behavior of the cable balancer can also be adjusted from gentle to aggressive in the controller.

In addition to the previously described "Balance" operating mode, a further operating mode of "Up/down control" is provided. For this purpose, the control handle is provided with an actuating ring which can be actuated in the upwards or downwards direction by the operator using his thumb to apply a force. The actuating ring is connected to a further force sensor, whose signals are supplied to the controller for lifting and lowering the load. When the actuating ring is used, a switch is made automatically from the "Balance" operating mode to the "Up/down control" operating mode.

It is generally known that such balancing lifting gears or cable balancers are used in different industrial processes, in which loads are moved and positioned in an exact manner by an operator. This relates, e.g., to manufacturing processes, in which one component is to be transported to another component and is to be attached thereto. The balancing lifting gears have been developed in order to reduce the amount of work for the operator in such a case.

Laid-open document US 2005/0267638 A1 discloses a control system for floor-free conveyors within the domain of assembly lines. The control system can be configured to adapt the floor-free conveyors in the form of cranes and balancing lifting gears, in particular their movement paths, to suit the individual assembly tasks. Semi-automatic movements can be provided or, e.g., the floor-free conveyor can return automatically to a starting position. In relation to the balancing lifting gears used, provision is made to adapt their response behavior to suit the users. For this purpose, maximum lifting and lowering speeds, maximum lifting and lowering accelerations, maximum and minimum lifting heights and the response sensitivity of the balancing lifting gear can be adjusted with respect to the balancing lifting gear. For this purpose, a corresponding display and various operating switches are provided in the region of a handle of the balancing lifting gear. In this control system, it is also possible to define specific regions, in which the floor-free conveyors cannot enter, in order to prevent collisions with parts of a building or machines, or the like.

SUMMARY OF THE INVENTION

The present invention achieves a simpler handling of a load with a balancing lifting gear, in particular when raising, removing, or attaching a load.

A control method, according to an aspect of the invention, for a balancing lifting gear having a lifting motor, a controller adapted to actuate the motor, a control handle with a force sensor is adapted to lift and lower a load-supporting device in which, in a "Balance" operating mode, the load-supporting device with or without a supported load is raised or lowered by the controller in response to a force applied by an operator, includes selecting from a "Pick-up" operating mode or an "Assemble" operating mode. In the "Pick-up" or "Assemble" operating modes, the load-supporting device is moved with the controller independent of a force of an operator in a lifting or lowering direction in response to signals determined by the force sensor.

A control method 30, according to an embodiment of the invention, is for controlling a balancing lifting gear having a lifting motor which can be actuated by the controller and uses a control handle with a force sensor to lift and lower a load-supporting device. In a "Balance" operating mode 34, the load-supporting device, with or without a picked-up load, is raised or lowered by the controller in response to a force applied by an operator 42. When raising, removing, or attaching a load from or to another component, a "Pick-up" operating mode 36 or an "Assemble" operating mode 38, 40 is selected, in which the load-supporting device is moved independently without the influence of the force of an operator by the controller in the lifting or lowering direction in dependence upon the signals determined by the force sensor 50. The at least partially independent movement of the load-supporting device at least in part eliminates the problem for the operator of adjusting the movement speed of the load-supporting device. The operator can thus concentrate on corrections to the movements in the horizontal direction. None of his time is taken up with controlling the vertical movement. Simpler handling of a load is achieved with a balancing lifting gear.

The term "independent" is thus to be understood as a type of automatic lifting and/or lowering movement, in which the operator does not touch either the control handle or the load and/or the load-supporting device and the controller of the balancing lifting gear moves automatically to a desired position. The independent movement allows speed and any contact forces which occur to be controlled more effectively. Therefore, in the "Pick-up" operating mode or in the "Assemble" operating mode, the movement of the load-supporting device is at least partly taken out of the operator's hands. "Independent" means, in this case, that this movement takes place even when the operator does not apply any force. The speed of the movement is not proportional to the operator's force. The speed is predetermined and is typically constant. However, it is possible to parameterize the force as well as the speed during a calibration procedure. The "Assemble" operating mode includes the two operating modes "Assemble I" and "Assemble II".

The phrase "operator's force" relates primarily to forces which are exerted by the operator, but also relates to forces which originate from other objects which the balancer lifting gear cannot distinguish from an operator's force. Forces originating from other objects are produced such as when the load strikes against, is placed on top of, or becomes hooked underneath other objects. The "operator's force" thus corresponds to an external force acting upon the force sensor.

In one mode of operation, the control method 30 provides that the controller does not process the force which otherwise in the "Balance" operating mode effects the independent movement in the lifting or lowering direction. This mode of operation is advantageously affected together with the "Assemble II" 40 and "Pick-up" 36 operating modes. The operator can thus concentrate on correcting the movements in the horizontal direction and/or the control of the vertical movement is taken completely out of the operator's hands.

In the "Pick-up" operating mode 36, the lifting motor is actuated by the controller such that the load-supporting device is raised until the force sensor measures a force which exceeds a preselected limit value 44. Subsequently, a change is made by the controller to a "Hold" operating mode in which the load-supporting device is held in a stationary manner. After the limit value has been reached and the load-supporting device is held in a stationary manner, an operator can release a clamping device, or the like, in which the load is held, and the load becomes free to be securely picked up. A change can then be made back either to the "Balance" operating mode or the "Up/down control" operating mode, or the "Hold" operating mode can be maintained, in which no vertical movements of the load are possible and in which a horizontal movement can be effected by means of a swing arm or a movement of the balancing lifting gear along a running rail. This "Pick-up" operating mode ensures, particularly when a clamped workpiece is being picked up, that on the one hand the holding force of the balancing lifting gear is large enough to ensure secure pick-up of the workpiece, and on the other hand is small enough to minimize the risk of canting or slipping of the workpiece.

In the "Pick-up" operating mode 36, the limit value may be preset in the controller. The limit value can have different values depending upon the type of load or workpiece and optionally in dependence upon the type of load-supporting device. In this case, it is suitably selected to be as low as possible or just large enough to ensure that the load is securely picked up. For example, the limit value can be preset in the range of 10 N to 100 N.

In order to guide the load for specific handling tasks without the load being raised or lowered by reason of the manual force applied, a "Hold" operating mode is provided in which a brake which acts upon the load-supporting device is actuated by the controller.

In one operating mode "Assemble I" 38, the lifting motor may be actuated by the controller such that the load-supporting device is independently raised and lowered by the controller in a taring procedure until a force which is previously tared in relation to the load, the load-supporting device and/or the control handle is measured by the force sensor 46. Such an "Assemble I" operating mode is used for attaching a load to another workpiece. This otherwise presents the particular risk that the attachment of a load to another workpiece will be interpreted incorrectly as an operator's force acting in an upwards direction, which would lead to an undesired raising of the load. Therefore, in this "Assemble I" operating mode 38, forces which act from below and above and are produced by manual forces of an operator or as previously described in connection with load-handling are processed within the framework of the taring procedure until the tared force is reached. The operator can continue the assembly movement or move his hands away from the load and the load-supporting device in order, after the tared state has been reached, to continue the assembling procedure on the basis thereof initially without any canting. In this mode of operation, the load can be almost floating when it is attached to a bar. This ensures that in the case of a larger force measured with respect to the tared force, the load-supporting device is lowered and in the case of a smaller force measured with respect to the tared force, the load-supporting device is raised.

In the "Assemble I" operating mode 38, the force applied by the operator may be monitored by the controller with an increased level of sensitivity compared within the "Balance" operating mode and the force applied by the operator is thus evaluated in the direction of a lower speed for raising and lowering the load-supporting device. This also applies to the disturbance forces during handling. This increase in the level of sensitivity corresponds to a reduction in the dynamics which in this regard is understood to mean that in comparison with the "Balance" operating mode the dynamics are reduced. On the basis of a typical maximum lifting and lowering speed in the range of 10 m/min to 30 m/min in the "Balance" operating mode in relation to a maximum evaluated manual force of such as 30 N, the reduction in dynamics causes the maximum lifting and lowering speed to change to a range of 5 m/min in the "Balance" operating mode in relation to a maximum evaluated manual force of 30 N. The dynamics may be halved. In of the "Assemble I" and "Balance" operating modes, the applied manual force may be proportional to the lifting or lowering speed determined therefrom.

In the "Assemble I" operating mode 38, the speed for raising and lowering the load-supporting device may be adjusted or limited by the controller to the range of 2 mm/s to 8 mm/s. By virtue of this limited movement speed, the operator is afforded sufficient reaction time to react to the movements of the load-supporting device. These low speeds permit particularly exact monitoring of the occurring force even when electronically or mechanically induced delays occur as the force is being determined.

In the "Assemble I" operating mode 38, the controller may establish any abutment, attachment, snagging or canting of the load caused by disturbance forces by differential monitoring. In differential monitoring, specific temporal differentials of the force measured by the force sensor are compared to a limit value. In the event that the limit value is exceeded within the "Assemble I" operating mode, the taring procedure is started. Therefore, in the event of the limit value being exceeded, this does not lead to a switch to the "Hold" operating mode but rather to an automatic taring of the load, which means that the operator can continue the handling work. In comparison with the "Balance" operating mode, the limit value established for the differential monitoring may amount only to about 30% in the "Assemble I" operating mode. For example, in the "Balance" operating mode, at a load force of 1000 N, the limit value amounts to about 200 N/50 ms and, in the "Assemble I" operating mode, it amounts to about 66 N/50 ms. The operator has the opportunity to allow the controller to complete the taring procedure or to influence it by specific manual forces, since the modified balancing operation continues to be active within the "Assemble I" operating mode.

In operating mode "Assemble II" 40, the lifting motor may be actuated by the controller such that the load-supporting device is raised as long as a force applied by an operator to the load, the load-supporting device and/or the control handle does not act in a downwards direction, and that the load-supporting device is lowered when a force that is applied by an operator to the load, the load-supporting device and/or the control handle, acts in a downwards direction 48. Such an "Assemble II" operating mode is used for attaching a load to another workpiece. This would otherwise present the particular risk that the attachment of the load to the other workpiece will be interpreted incorrectly as an operator's force acting in an upwards direction, which would lead to an undesired raising of the load. Therefore, in this "Assemble II" operating mode 40, forces which act from below are ignored and instead the load is moved constantly upwards with a type of "uplift" as long as the operator does not apply a downwardly directed force. The operator can thus complete the assembly task more simply, as his intervention is reduced to the downwardly acting manual force.

In the "Assemble II" operating mode 40, the force applied by the operator may be monitored by the controller with an increased level of sensitivity compared within the "Balance" operating mode and the force applied by the operator is thus evaluated in the direction of a lower speed for raising and lowering the load-supporting device. Completion of the handling task by the operator can be facilitated as a result, as in that case smaller measurement value changes of the force sensor are already evaluated as a change in the operator's force.

In the "Assemble I" and "Assemble II" operating modes, a frequency of direction changes movement of the load-supporting device that may be monitored by the controller. A speed at which the load-supporting device is raised and/or lowered is reduced and/or a change is made to the "Hold" operating mode when the frequency exceeds a preselected limit value. In cases where the attachment of the load to another object is complicated or in the end phase of the attachment process, many movement corrections may be required within a confined space. In this embodiment, the changes in the movement direction can be registered in terms of time and the number thereof within a certain time period, such as the last 20 seconds, can be used as a measure of the present frequency. If, in this case, a limit value, such as 8 changes within 20 seconds, is exceeded, this may be assessed as an indication that the assembly process requires too frequent intervention by the operator. In response to this assessment, the speed at which the load-supporting device is lowered and/or raised may be reduced, whereby more time is available to the operator to intervene and on the whole the assembly procedure becomes smoother.

In the "Pick-up" operating mode and in the "Assemble II" operating mode the speed for raising the load-supporting device may be adjusted in the range of 2 mm/s to 10 mm/s in the controller. By virtue of this limited movement speed, the operator is afforded sufficient reaction time to react to the movements of the load-supporting device. These low speeds permit particularly exact monitoring of the occurring force even when electronically or mechanically induced delays occur as the force is being determined.

In a "Weigh" operating mode 41 a load, force which acts upon the force sensor can be measured by the controller 49. From this load force, the controller is able to determine the weight, since the weight of the load-supporting device and of the corresponding part of the control handle would have been determined in a preceding step. Then, for the "Balance", "Assemble I" and "Assemble II" operating modes the controller can use the signal of the force sensor to determine a manual force or a disturbance force, since the load force is now known in terms of a tare force which continues to be applied to the force sensor.

The "Weigh" operating mode can be started by the controller when the operator takes his hand away from the control handle. For this purpose, a corresponding sensor for detecting a hand is disposed on the control handle. In a first step, an optionally occurring movement of the balancing lifting gear is then stopped, i.e., the desired speed of the balancing lifting gear is set to zero.

A balancing lifting gear, according to another aspect of the invention, includes a lifting motor, a controller that is adapted to actuate the lifting motor, and a control handle with a force sensor that is adapted to lift and lower a load-supporting device. The controller is adapted to operate in a "Balance" operating mode in which the load-supporting device, with or without a picked-up load, is raised or lowered by the controller in response to a force applied by an operator. The controller is adapted to operate in a "Pick-up" operating mode or an "Assemble" operating mode in which the load-supporting device is moved by the controller in the lifting or lowering direction in dependence upon the signals determined by the force sensor independent of a force applied by an operator.

In accordance with another aspect of the invention, a simpler handling of a load with a balancing lifting gear may be achieved, in particular when raising, removing or attaching a load from or to another component, by virtue of the fact that a lifting motor can be actuated by a controller and uses a control handle with a force sensor to lift and lower a load-supporting device operates with the previously described control methods.

BRIEF DESCRIPTION OF THE DRAWINGS

An exemplified embodiment of the invention will be explained hereinafter with reference to the Figures, in which.

DESCRIPTION OF THE PREFERRED EMBODIMENT

Figure 1:
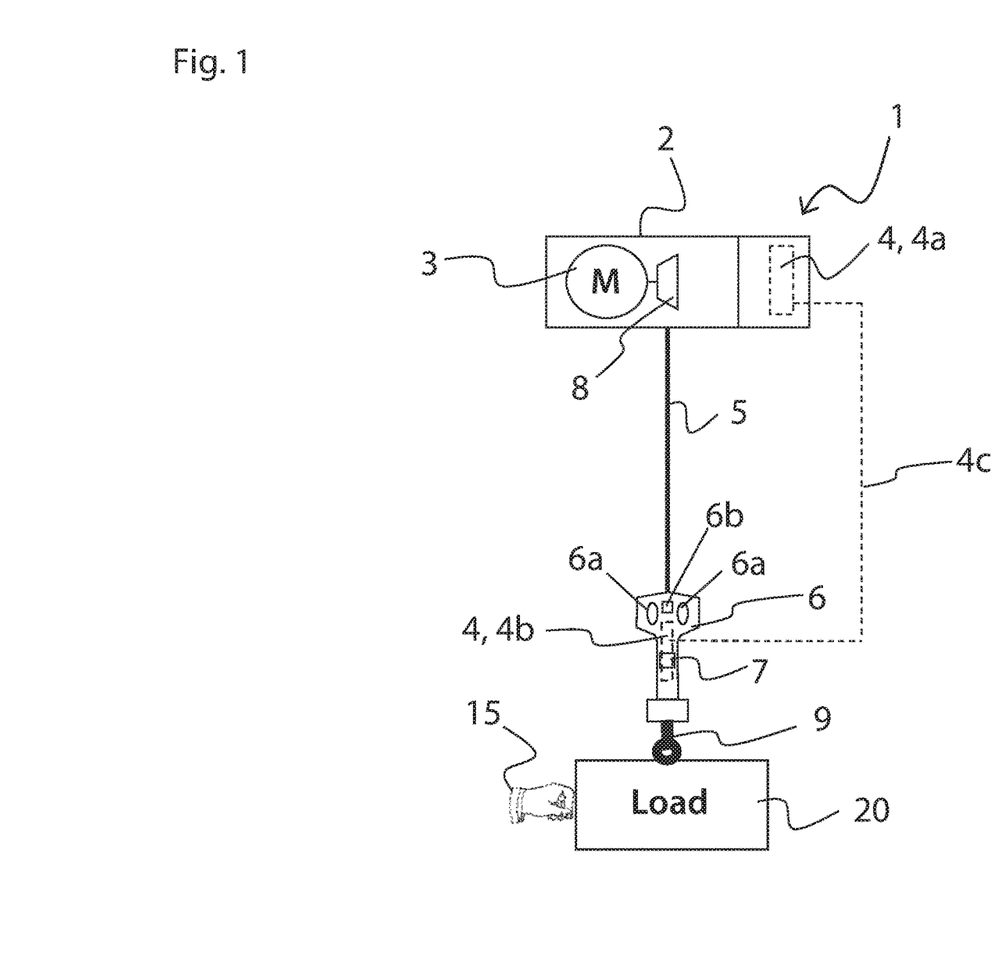
FIG. 1 shows a block diagram of a balancing lifting gear in accordance with an embodiment of the invention having a load suspended therefrom.

Referring now to the drawings and the illustrative embodiments depicted therein, FIG. 1 illustrates a balancing lifting gear 1 in a greatly simplified manner. Disposed in a housing 2 in this case are a lifting motor 3 and a housing controller 4a which is part of a complete controller 4 for the balancing lifting gear 1. The housing 2 is typically suspended in a positionally fixed manner from a supporting construction, not shown, or from a travelling mechanism which is movable along a rail, which are well known in the art. The lifting motor 3 uses a transmission 10 to drive a drum 11 (see FIG. 2) onto which or from which a cable 5 can be wound up and unwound, respectively. Cable 5 serves as a flexible support means for lifting and lowering a load 20. It is also feasible to use textile bands or chains. The lifting motor 3 is preferably formed as an electric lifting motor; however, it can also be a pneumatic motor or hydraulic motor. A partial length of the cable 5 is unwound and hangs downwards out of the housing 2. A control handle 6 having various operating elements 6a is disposed at a lower, load-side end of the cable 5. The control handle 6 in the illustrated embodiment is T-shaped in formation and has a cylindrical gripping region for handling the load 20 and an operating region, which widens upwards in a T-shaped manner, for accommodating the operating elements 6a which the operator can easily reach using his thumb. The operator can use the operating elements 6a to select between different operating modes of the balancing lifting gear 1 and also to control the balancing lifting gear 1 manually in an "Up and down control" operating mode.

Also, disposed in the operating region is a display 6b which displays the respective operating mode, status reports and any malfunction statuses. The control handle 6 also has a handle controller 4b which is a further part of the complete controller 4 for the balancing lifting gear 1. The handle controller 4b is connected to the controller 4 via an optionally wireless connection, not illustrated. Fastened to the lower end of the control handle 6 is a load picking-up means, such as a load-supporting device 9, to which a load 20 is attached. In the present case, the load-supporting device 9 is formed as a hook but can also be a lug or a gripper. The connection of the load-supporting device 9 to the control handle 6 is formed as a coupling, in order to permit an easy change of the load-supporting device 9.

Located in the interior of the control handle 6 is not only the handle controller 4b but also a force sensor 7 which measures a force acting between the cable 5 and the load-supporting device 9.

An operator whose hand 15 is schematically illustrated can guide the load 20 in a lifting and lowering direction by means of the control handle 6 in a first operating mode designated as "Up/down control". For this purpose, the operator can use the operating elements 6a disposed in the control handle 6. Alternatively, the control handle 6 can have a further force sensor, not illustrated, and disposed therein which supports the control handle 6 on the cable 5 or load-supporting device 9. This force sensor can then be used to determine upwardly or downwardly directed control forces of the operator on the control handle 6 which are then converted by the controller 4 into commands for lifting or lowering the load-supporting device 9. As soon as the operator takes hold of the control handle 6, a switch is made to the "Up/down control" operating mode. For this purpose, a corresponding sensor can be provided on the control handle 6 which detects the presence of the operator's hand.

In a further operating mode designated as "Balance", the operator can effect lifting and lowering of the load 20 by directly acting upon the load 20 or the load-supporting device 9 can effect lifting or lowering of the load 20. In this case, forces exerted upon the load 20 by the operator are translated into control commands for the lifting motor 3, so that the load 20 is moved in the direction corresponding to the direction in which the operator applies force. In this case, the operator senses the lifting or lowering of the load 20 as being quasi weightless. In the "Balance" operating mode, the handle controller 4b determines the operator's force by subtracting the weight force of the load-supporting device 9, the load 20 and the control handle 6 from the force registered by the force sensor 7. From this, control parameters for the lifting motor 3 are determined. As long as the load 20 is moved freely up and down, the Balance mode represents an ideal mode of operation. In the event of abutment, attachment, snagging or canting of the load 20, the balancing lifting gear 1 is protected by means of the controller 4 via so-called differential monitoring.

Within the framework of the differential monitoring, the controller 4 monitors the change in the measured force over time. If this differential exceeds a previously established limit value stored in the controller 4, the controller 4 changes automatically from the "Balance" operating mode to the "Hold" operating mode. For example, in the "Balance" operating mode, at a load force of 1000 N, the limit value amounts to about 200 N/50 ms. The time of 50 ms corresponds to a control cycle. Starting from the now reached "Hold" operating mode, the operator now has the opportunity to select between the "Pick-up", "Assemble I" and "Assemble II" operating modes for the handling task due to be carried out.

A brake 8 which is disposed in the housing 2 is used in the operating mode designated as "Hold". The load 20 is held at the height it has been taken up to and the operator can guide the load 20, which is suspended from the balancing lifting gear, directly or by taking hold of the load-supporting device 9, without the forces exerted upon the load 20 causing the load 20 to be raised or lowered. In this case, the free length of the cable 5 is thus kept constant even when the operator exerts forces along the cable 5. This operating mode can be used when the balancing lifting gear 1 is suspended from a travelling mechanism which is manually movable along a rail. The operator can thus pull the load 20 along the rail. A swivel arm can also be provided instead of the rail.

There is also a "Weigh" operating mode for providing the controller 4 in the other operating modes of "Balance", "Assemble I" and "Assemble II" with the opportunity of using the signal of the force sensor 7 to determine a manual force or a disturbance force. In the "Weigh" operating mode, the controller 4 uses the signal of the force sensor 7 to determine a load force in terms of a tare force. For this purpose, it is necessary for the load 20 to be suspended freely from the cable 5 and not to be influenced by an operator's hand 15 or by other disturbance forces. Therefore, it is possible for the controller 4 to start the "Weigh" operating mode automatically when the operator takes his hand 15 off the control handle 6. For this purpose, a corresponding sensor (not shown) for detecting the hand 15 on the control handle 6 is disposed on the control handle 6. Beforehand, a still optionally occurring movement of the balancing lifting gear 1 is stopped, i.e., the desired speed of the balancing lifting gear is set to zero. The controller 4 can then use the measured load force to determine the weight of the load 20, since the weight of the currently used load-supporting device 9 and of the corresponding part of the control handle 6 have been determined in a preceding step using the "Weigh" operating mode. The load force or tare force relevant for the controller 4 includes the weight forces of the currently used load-supporting device 9 and of the corresponding part of the control handle 6.

Figure 2:
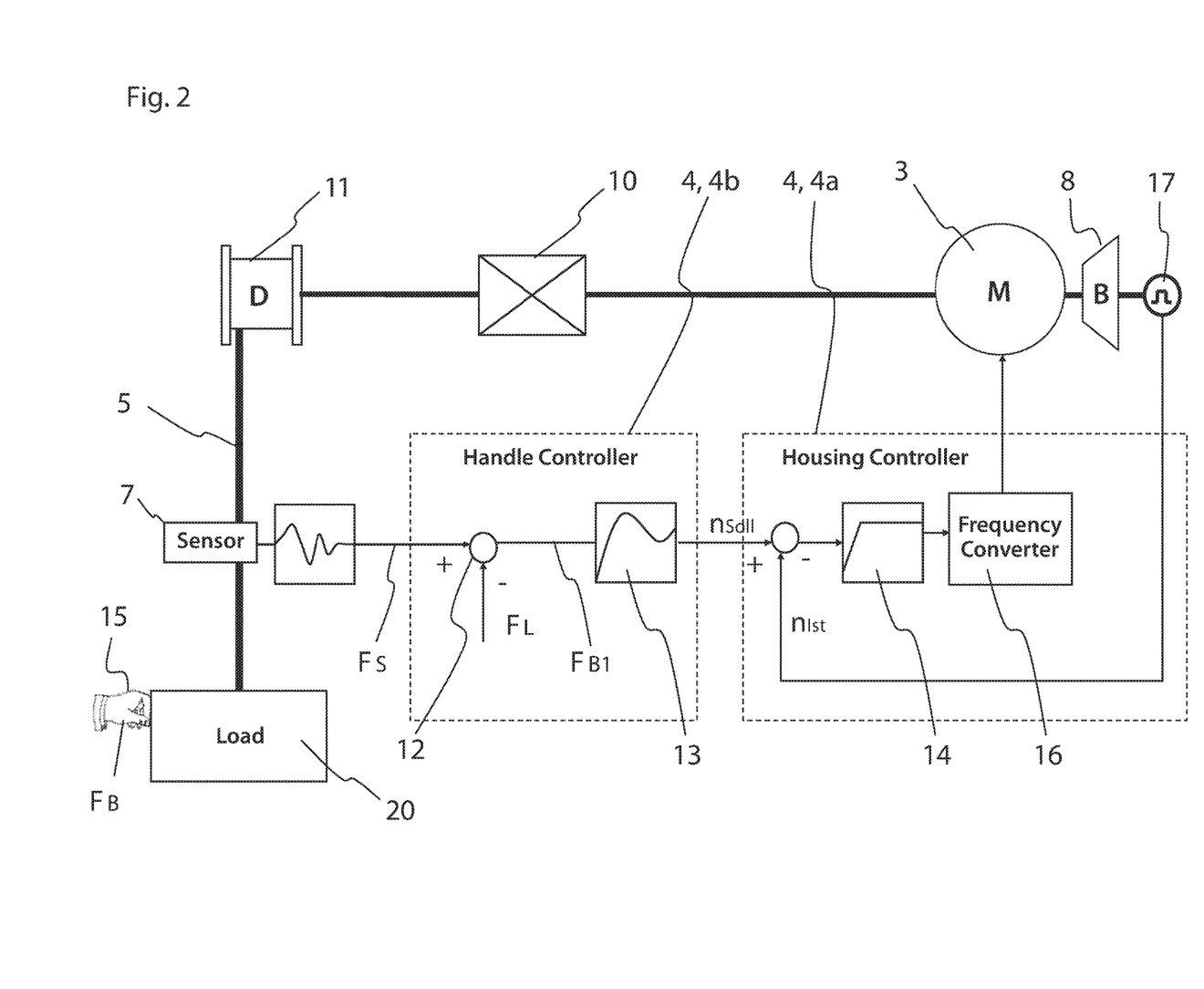
FIG. 2 shows an electronic schematic diagram of the balancing lifting gear used in FIG. 1.

FIG. 2 illustrates a schematic diagram of the balancing lifting gear 1 shown in FIG. 1. In addition to FIG. 1, it is illustrated that the lifting motor 3 with the brake 8 drives a cable drum 11 via a transmission 10. The cable 5 for lifting and lowering the load 20 is wound up and unwound using the cable drum 11. Disposed between the cable drum 11 and the load 20 is the force sensor 7 which measures the force FS in the cable 5. In the event that only one load 20 is suspended from the cable 5 and no operator's force FB acts upon the load 20, the control handle 6 or the load-supporting device 9, the cable force FS measured by the force sensor 7 corresponds to the load force FL of the load 20 suspended from the cable 5. The load force FL is typically derived from the mass m of the load 20 multiplied by the gravity acceleration g. The load force FL can be known or can be supplied manually to the controller 4 or can be determined in a "Weigh" operating mode in the case of a load 20 which is freely suspended from the cable 5. In the event that in addition to the load 20, an operator's force FB also acts upon the cable 5, the cable force FS measured by the force sensor 7 corresponds to the sum of the load force FL and operator's force FB and any disturbance forces FE. A force value FB1 which corresponds virtually to the operator's force FB but also contains any disturbance forces FE is determined from the difference of the cable force FS and the load force FL in a summation member 12. In a filter 13, a desired rotational speed nsoll is determined, as a control variable for a rotational speed controller 14 from the calculated force value FB1. The filter 13 is formed as a $2^{nd}$ order low-pass filter, whose buckling frequency is adjusted with the aid of the tare force determined in the "Weigh" operating mode. The rotational speed controller 14 formed as a PI-controller is provided to a frequency converter 16 to actuate the lifting motor 3, by means of which the lifting or lowering of the load 20 desired by the applied operator's force FB is then performed. The rotational speed controller 14 operates in a closed loop system, which means that the lifting motor 3 is allocated a rotational speed sensor 17, whose rotational speed measurement signal nist is supplied as an actual variable to the rotational speed controller 14.

Figure 3A:
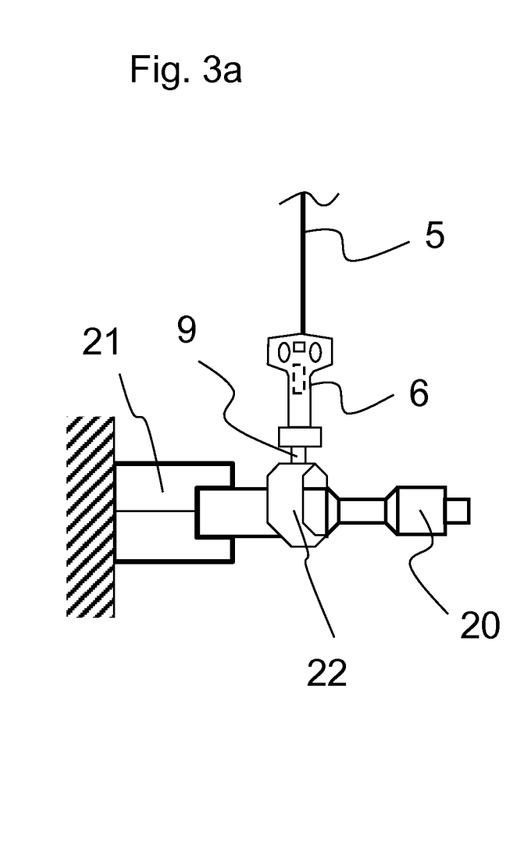
FIG. 3a shows a block diagram of a workpiece in a clamping device prior to being picked up by a balancing lifting gear.
Figure 3B:
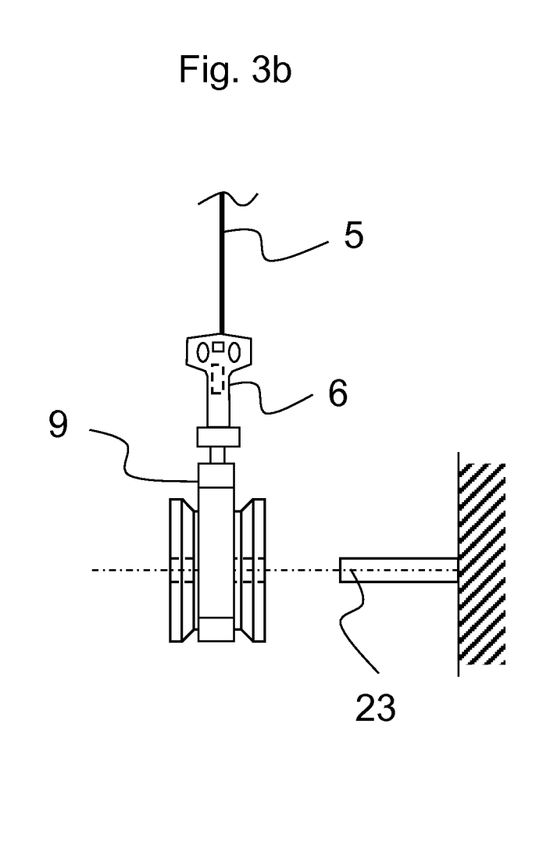
FIG. 3b shows a block diagram of a workpiece, which is guided with a balancing lifting gear, prior to being attached to another workpiece.
Figure 4:
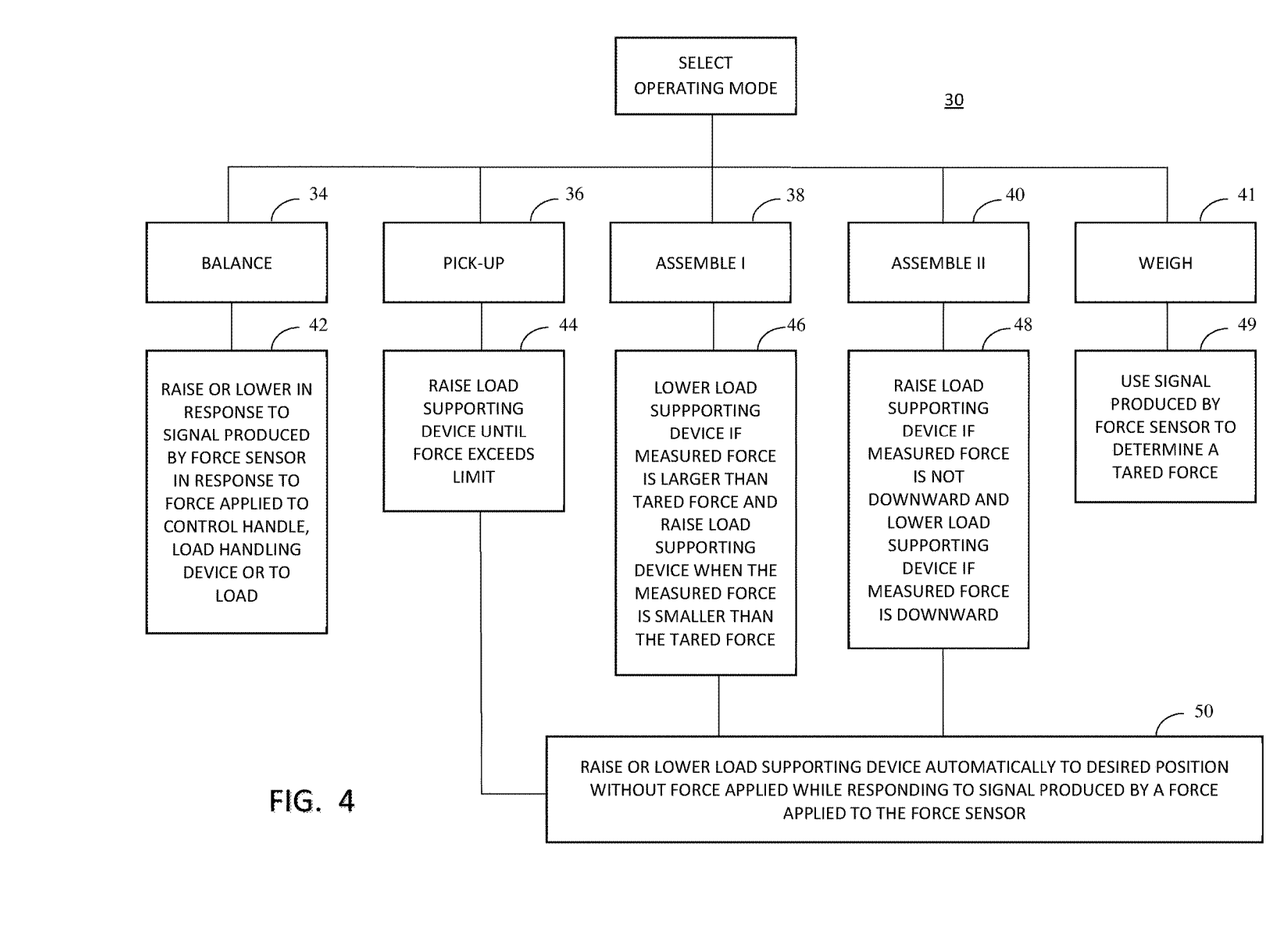
FIG. 4 shows a block diagram of a control method for a balancing lifting gear.

FIGS. 3a and 3b illustrate operating situations, in which neither the "Balance" operating mode nor the "Hold" operating mode is ideal. FIG. 3a illustrates a load 20 in the form of a workpiece which is clamped in a clamping device 21, such as in a turning lathe. The workpiece 20 is to be removed from the clamping device 21 with the aid of the balancing lifting gear 1. For this purpose, the workpiece 20 has a loop-shaped lifting means 22, which is suspended from the load-supporting device 9, clasped around it in the region of its centre of gravity. Then, in the "Balance" operating mode, the lifting means 22 is conventionally clamped in a manner induced by a manual force. In this case, the workpiece 20 continues to be held in the clamping device 21. Bracing of the lifting means 22 presents the risk that the lifting means 22 will be clamped either excessively or insufficiently. In the event that the lifting means 22 is clamped excessively, releasing the clamping device 21 can cause the workpiece 20 to be raised further and become canted in the clamping device 21. Alternatively, in the event that the lifting means 22 is insufficiently clamped, releasing the clamping device 21 can cause the workpiece to slip out of the clamping device 21 and then be brazed in a jerky fashion by the lifting means 22.

For this operating procedure of picking up a workpiece 20 from a clamping device 21, a "Pick-up" operating mode can be selected on the control handle 6. After activation of this operating mode, the operator lets go of the control handle 6 and also the load-supporting device 9 and the load 20, and the load-supporting device 9 is independently raised at a speed of, e.g., 2 mm/s until the force registered by the force sensor 7 has reached a limit value parameterized in the controller. Typical limit values are approximately 10 to 100 N. The selectable speeds are in the range of 2 mm/s to 10 mm/s. This serves as an indication of secure but not excessively tight clamping of the lifting means 22 and thus holding of the workpiece. The load-supporting device 9 is then independently stopped and the balancing lifting gear 1 changes to the "Hold" operating mode. The operator can then release the clamping device 21 and guide the workpiece 20 out laterally.

In general, the "Pick-up" operating mode can be used for handling tasks, in which workpieces or loads 20 are transferred from a held or clamped appendage to the balancing lifting gear 1 without, in this case, being lowered initially onto a floor or other object.

Further operating modes "Assemble I" and "Assemble II" are explained hereinafter with reference to FIG. 3b. FIG. 3b illustrates a load-supporting device 9 which is formed as a gripper and by means of which a load 20 in the form of a hollow cylinder, wheel or pipe is raised. The load 20 is illustrated as picked up in the region of its centre of gravity and is, therefore, substantially horizontally aligned with its longitudinal extension. In the present case, the handling task is illustrated as consisting of attaching the load 20 to a stationary bar 23 supported on a wall or another component. The bar 23 is to be understood as being symbolic and is to serve as a type of placeholder for all manner of components, in which comparable assembly tasks are to be completed. The bar 23 can thus be, for example, a spindle, a mandrel or a chuck of a turning lathe. Since the inner diameter of the hollow cylinder and the outer diameter of the bar 23 differ only slightly, this handling task presents a great risk that the hollow cylinder and the bar 23 will cant with one another, since in the "Balance" operating mode, attachment of the load 20 to the bar 23 or a snagging of the load 20 on the bar 23 are evaluated by the controller 4 as force signals for lifting and lowering.

For such handling tasks, the "Assemble I" operating mode or alternatively "Assemble II" operating mode can be selected on the control handle. When selecting the "Assemble I" operating mode, the sensitivity in the controller 4 is increased and at the same time the load changes (differentials in the load measurement) are recorded more sensitively. In this regard, increasing the sensitivity is understood to mean that in comparison with the "Balance" operating mode the dynamics are reduced. On the basis of a typical maximum lifting and lowering speed in the range of 10 m/min to 30 m/min in the "Balance" operating mode in relation to a maximum evaluated manual force of, for example 30 N, the reduction in dynamics changes the maximum lifting and lowering speed to a range of 5 m/min in the "Balance" operating mode in relation to a maximum evaluated manual force of 30 N. In the illustrated embodiment, the dynamics are halved. In this case, i.e., in the "Assemble I" and "Balance" operating modes, the applied manual force typically continues to be proportional to the lifting or lowering speed determined therefrom. Moreover, at the beginning of the "Assemble I" operating mode, the total of the load 20, load-supporting device 9 and control handle 6 are weighed by the "Weigh" operating mode and the balancing lifting gear 1 is tared if this has not already taken place beforehand. The controller 4 thus knows the load force FL and can thus determine the operator's force FB and any disturbance forces. If the load 20 then abuts against the bar 23 during horizontal assembly, the controller 4 then begins to tare the balancing lifting gear 1 by means of independent slow lifting or lowering movements. Any abutment, attachment, snagging or canting of the load 20 is established by the controller via so-called differential monitoring. In comparison with the "Balance" operating mode, the limit value established for the differential monitoring amounts only to about 30% in the case of the "Assemble I"

operating mode. For example, in the "Balance" operating mode, at a load force of 1000 N the limit value amounts to about 200 N/50 ms, and in the "Assemble I" operating mode it amounts to about 66 N/50 ms. The time of 50 ms corresponds to a control cycle. In the "Assemble I" operating mode, the assembling speeds are in the range of 2 mm/s to 8 mm/s. If the limit value is exceeded, the taring procedure begins automatically in the "Assemble I" operating mode. The operator then has the opportunity to allow the controller 4 to complete the taring procedure or to influence it by specific manual forces, since the modified balancing operation continues to be active within the "Assemble I" operating mode.

Whether the controller 4 causes a movement of the load in the lifting or lowering direction in conjunction with the commenced taring procedure depends upon whether the force sensor 7, starting from its tared state, measures a larger or smaller force in comparison with the previously tared load force. A larger measured force signifies a strike against the mandrel 23 from below and, therefore, the load 20 is lowered. A smaller measured force otherwise results in the load being raised. The operator can continue the assembly procedure by pushing in a horizontal direction until the load 20 abuts against another object. By means of this method, a load can be almost floating when it is fitted onto a mandrel or into a chuck. When the load 20 has reached its end position, the operator opens or releases the load-supporting device 9 and switches to the "Balance" or "Up/down control" operating mode.

In the "Assemble II" operating mode, upwardly directed forces onto the load-supporting device 9, the load 20 and the control handle 6 are ignored and do not cause the load 20 to be raised. However, in this operating mode it is provided that the load-supporting device 9 is raised at a low speed of 5 mm/s, for example, it is subjected to a type of artificial "uplift". Furthermore, the level of sensitivity with which the force measured by the force sensor 7 is registered is increased. If a downwardly directed operator's force is registered, the load-supporting device 9 is lowered at a constant speed of 5 mm/s. The selectable speeds are in the range of 2 mm/s to 10 mm/s. Furthermore, a verification is made as to how often changes in the movement direction of the load-supporting device 9 occur. If, e.g., more than 20 changes occur within 20 seconds, this serves as an indication that the operator is required to intervene too frequently. In this case, the speeds for lifting and for lowering are reduced, in order to afford the operator more reaction time or to change to the "Hold" operating mode.

Therefore, in the "Assemble II" operating mode, the operator can effect the slight lowering of the load 20 solely by means of a downwardly directed force in cooperation with the automatic uplift, in order to be able to slide the load onto the bar 23, and at the same time the advantage of the balancing lifting gear 1, namely, that the load 20 appears almost weightless, is retained.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A control method for a balancing lifting gear that lifts and lowers a load-supporting device, said balancing lifting gear having a lifting motor, a controller adapted to actuate said motor, a control handle, said control handle including a force sensor that produces a signal in response to a force applied by at least one chosen from an operator, another object striking the load-supporting device, another object placed on top of a load supported by the load-supporting device, and the load supporting device becoming hooked under another object, said method comprising:
   providing said control handle an operating mode selector that receives an operator selection from among at least a Balance operating mode, a Pick-up operating mode, and an Assemble operating mode;
   selecting from among the Balance operating mode, the Pick-up operating mode, or the Assemble operating mode;
   when the Balance operating mode is selected, raising or lowering the load-supporting device in a vertical lifting or lowering direction by the controller in response to the signal produced by the force sensor in response to the force applied by the operator to the control handle or the force applied to the load-handling device, or the force applied to the load supported by the load-handling device;
   when either the Pick-up operating mode or the Assembly operating mode is selected, in response to the selection raising or lowering the load-supporting device in a vertical lifting or lowering direction by the controller by moving the load-supporting device automatically to a desired position without a further force applied to the control handle or to the load, while the controller responds to the signal produced by a force applied to the force sensor while automatically raising or lowering of the load-supporting device in the vertical lifting or lowering direction.

2. The control method as claimed in claim 1 including actuating the lifting motor by the controller in the Pick-up operating mode such that the load-supporting device is raised until the force sensor measures a force which exceeds a preselected limit value, and the controller subsequently changes to a Hold operating mode, in which the load-supporting device is held in a stationary manner.

3. The control method as claimed in claim 2 wherein the preselected limit value is preset in the controller in the Pick-up operating mode.

4. The control method as claimed in claim 3 wherein the preset limit value is in the range of 10 N to 100 N.

5. The control method as claimed in claim 1 further including a Hold operating mode in which a brake which acts upon the load-supporting device is actuated by the controller.

6. The control method as claimed in claim 1 wherein the Assembly operating mode includes an Assemble I operating mode in which the lifting motor is actuated by the controller in a manner that the load-supporting device is automatically raised and lowered by the controller in a taring procedure until a particular force in relation to the load, the load supporting device and/or the control handle is measured by the force sensor, wherein the particular force is one that was previously tared.

7. The control method as claimed in claim 6 wherein the load-supporting device is lowered when the measured force is larger than the tared force and the load-supporting device is raised when the measured force is smaller than the tared force.

8. The control method as claimed in claim 6 wherein the signal produced by the force sensor in response to the force applied by the operator to the control handle in the Assemble I operating mode is monitored by the controller with an increased level of sensitivity compared with in the Balance operating mode and the signal produced by the force sensor in response to the force applied by the operator is thus evaluated in the direction of a lower speed for raising and lowering the load-supporting device in the Assembly I operating mode than in the Balance operating mode.

9. The control method as claimed in claim 6 wherein the speed for raising and lowering the load-supporting device in the Assemble I operating mode is selected by the controller from within a range of 2 mm/s to 8 mm/s.

10. The control method as claimed in claim 6 wherein the controller determines an abutment, attachment, snagging or canting of the load in the Assemble I operating mode by differential monitoring of the force measured by the force sensor, in which specific temporal differentials of the force measured by the force sensor are compared to a limit value and the taring procedure is carried out in the event that the limit value is exceeded.

11. The control method as claimed in claim 1 wherein said Assembly operating mode includes an Assemble II operating mode in which the lifting motor is actuated by the controller such that the load-supporting device is raised as long as the signal produced by the force sensor in response to the force applied by the operator to the control handle does not act in a downwards direction, and that the load-supporting device is lowered when the signal produced by the force sensor in response to the force applied by the operator to the control handle acts in a downwards direction.

12. The control method as claimed in claim 11 wherein the signal produced by the force sensor in response to the force applied by the operator to the control handle in the Assemble II operating mode is monitored by the controller with an increased level of sensitivity compared with a force applied in the Balance operating mode and the signal produced by the force sensor in response to the force applied by the operator to the control handle is thus evaluated in the direction of a lower speed for raising and lowering the load-supporting device in the Assemble II operating mode than in the Balance operating mode.

13. The control method as claimed in claim 6 wherein a frequency of direction changes of movement of the load-supporting device is monitored by the controller in the Assemble I and Assemble II operating modes and a speed at which the load-supporting device is raised or lowered is reduced and/or a Hold operating mode is selected if the frequency exceeds a particular limit value.

14. The control method as claimed in claim 1 wherein the speed for raising and lowering the load-supporting device is selected by the controller from the range of approximately 2 mm/s to approximately 10 mm/s in the Pick-up operating mode and in the Assemble II operating mode.

15. The control method as claimed in claim 11 further including a Weigh operating mode in which a load force acting upon the force sensor is measured by the controller.

16. The control method as claimed in claim 15 wherein the Weigh operating mode is started by the controller when the operator takes the operator's hand off the control handle.

17. A balancing lifting gear, comprising:
a lifting motor, a controller that actuates said lifting motor, an operating mode selector, and a control handle with a force sensor, said force sensor produces a signal in response to a force applied by at least one chosen from an operator, another object striking a load-supporting device, another object placed on top of the load supported by the load-supporting device, and the load-supporting device becoming hooked under another object in an operation to lift and lower a load-supporting device wherein said operating mode selector receives an operator selection from among at least a Balance operating mode, a Pick-up operating mode, and an Assemble operating mode;
wherein said controller is selectable to operate in the Balance operating mode in which the load-supporting device, with or without a picked-up load, is raised or lowered by the controller in a vertical lifting or lowering direction in response to the signal produced by the force sensor in response to the force applied by the operator to the control handle or the force applied to the load-handling device or the force applied to a load supported by the load-handling device; and
wherein said controller is selectable to operate in the Pick-up operating mode or the Assemble operating mode in which in response to the selection the load-supporting device is raised or lowered by the controller in the vertical lifting or lowering direction automatically to a desired position without a further force applied to the control handle or to the load, while the controller responds to the signal produced from a force applied to the force sensor while automatically raising or lowering of the load-supporting device in the vertical lifting or lowering direction.

18. The control method as claimed in claim 1 wherein when either the Pick-up operating mode or Assembly operating mode is selected then the controller responds to the signal produced by a force applied to the force sensor with increased sensitivity as compared with the Balance operating mode or until a limit value is reached.

19. The balancing lifting gear as claimed in claim 17 wherein said controller responds to the signal produced from the force sensor with increased sensitivity as compared with the Balance operating mode or until a limit value is reached when the controller is selected to operate in the Pick-up operating mode or the Assembly operating mode.

* * * * *